US 8,606,955 B1

(12) United States Patent
Fernandes et al.

(10) Patent No.: US 8,606,955 B1
(45) Date of Patent: Dec. 10, 2013

(54) PAUSE-BUTTON CONTENT RENDERING

(75) Inventors: Roshan Fernandes, Mumbai (IN);
Bindu Mary Oommen, Hyderabad (IN)

(73) Assignee: Google Inc., Mountain View, CA (US)

( * ) Notice: Subject to any disclaimer, the term of this patent is extended or adjusted under 35 U.S.C. 154(b) by 241 days.

(21) Appl. No.: 13/278,291

(22) Filed: Oct. 21, 2011

(51) Int. Cl.
*G06F 15/16* (2006.01)

(52) U.S. Cl.
USPC ........................ 709/231; 709/217; 709/219

(58) Field of Classification Search
USPC .................................. 709/217–219, 230, 231
See application file for complete search history.

(56) References Cited

U.S. PATENT DOCUMENTS

| | | | | |
|---|---|---|---|---|
| 6,038,367 | A * | 3/2000 | Abecassis | 386/262 |
| 7,567,671 | B2 * | 7/2009 | Gupte | 380/239 |
| 7,607,157 | B1 * | 10/2009 | Inoue et al. | 725/102 |
| 7,707,224 | B2 | 4/2010 | Chastagnol et al. | |
| 8,078,493 | B2 * | 12/2011 | Rosenberg et al. | 705/14.4 |
| 2005/0060229 | A1 * | 3/2005 | Riedl et al. | 705/14 |
| 2005/0060742 | A1 * | 3/2005 | Riedl et al. | 725/34 |
| 2005/0060745 | A1 * | 3/2005 | Riedl et al. | 725/42 |
| 2006/0140584 | A1 * | 6/2006 | Ellis et al. | 386/83 |
| 2007/0124762 | A1 * | 5/2007 | Chickering et al. | 725/35 |
| 2008/0109369 | A1 | 5/2008 | Su et al. | |
| 2008/0178211 | A1 * | 7/2008 | Lillo et al. | 725/32 |
| 2008/0207182 | A1 * | 8/2008 | Maharajh et al. | 455/414.1 |
| 2008/0320512 | A1 * | 12/2008 | Knight | 725/32 |
| 2011/0225417 | A1 * | 9/2011 | Maharajh et al. | 713/150 |
| 2012/0072960 | A1 * | 3/2012 | Rosenberg et al. | 725/104 |

OTHER PUBLICATIONS

Screen shot of website dated May 8, 2011: http://www.cbs.com/primetime/60_minutes/video/?pid=Hwiua1lltcOuuHiAYN_mg4d1s6_ww0FL.
Screen shot of website dated Oct. 14, 2011: http://abc.go.com/watch/2020/SH559026/VD55148316/2020-1014-children-of-the-plains.

* cited by examiner

*Primary Examiner* — Phuoc Nguyen
(74) *Attorney, Agent, or Firm* — Young Basile Hanlon MacFarlane P.C.

(57) ABSTRACT

Systems and methods for delivering and rendering content to a user having a computing device including a display are disclosed. One method performed by one or more servers includes receiving a request for primary content, sending the primary content to the computing device, the primary content configured to be rendered in a first portion of the display of the computing device, receiving a request for secondary content, and sending the secondary content to the computing device, the secondary content configured to be rendered in a second portion of the display upon a request to pause rendering of the primary content. The method can further include receiving a request to resume rendering of the primary content, stopping the sending of the secondary content to the computing device, and again sending the primary content to the computing device.

18 Claims, 5 Drawing Sheets

PAUSE-BUTTON CONTENT RENDERING

TECHNICAL FIELD

The disclosure relates generally to delivering and rendering content and specifically to delivering and rendering primary and secondary content to a user having a computing device including a display.

BACKGROUND

Hosting websites allow users to share content from various sources with additional users having access to the hosting website. Hosting websites allow users to upload and store content as digitally encoded media files. Additional users can then access the hosting website, for example through a web browser application window, to playback the stored content directly on a computing device or transmit to and playback the content on another device. Example computing devices capable of accessing hosting websites and playing back content are personal computers, laptops, notepads, tablet computers, personal digital assistants, and mobile telephones. These devices may allow playback of content, for example, in an embedded display within a web browser application window, in a window of an application executed by the processor of the computing device or by any other suitable display means of the computing device.

In order to avoid charging users for sharing and playing back content, the operator of a hosting website can charge advertisers to display advertisements in proximity to the content being played back by a user. The operator can also overlay advertisements on the content by, for example, placing a textual advertisement over a portion of a video upon user selection of the video for playback. Advertisers measure success of web-based advertising using click-through rate (CTR), the number of times users click on the displayed advertisement divided by the number of times the advertisement is shown to users. Existing hosting website advertisement methods are becoming ineffective at achieving high CTR, as users have become accustomed to current methods and/or can ignore the advertisements based how they are delivered to the user.

SUMMARY

Systems and methods for delivering content to a user having a computing device including a display are disclosed.

In one implementation, a method is disclosed for delivering content to a user having a computing device including a display. The method includes receiving a request for primary content, sending the primary content to the computing device, the primary content configured to be rendered in a first portion of the display of the computing device, receiving a request for secondary content, and sending the secondary content to the computing device, the secondary content configured to be rendered in a second portion of the display upon a request to pause rendering of the primary content.

In another implementation, a method is disclosed for rendering content to a user having a computing device including a display. The method includes receiving a signal to render primary content from the user, rendering the primary content in a first portion of the display of the computing device, receiving a signal to pause rendering of the primary content from the user, pausing the rendering of the primary content in the first portion of the display, and rendering the secondary content in a second portion of the display.

In a third implementation, a system is disclosed for delivering content to a user. The system includes a server in communication with a network, which is in turn in communication with a computing device including a display. The server includes a processor for controlling the operations of the server and a memory for storing data and program instructions used by the processor. The processor is configured to execute instructions stored in the memory to receive a request for primary content, send the primary content to the computing device, the primary content configured to be rendered in a first portion of the display of the computing device, receive a request for secondary content, and send the secondary content to the computing device, the secondary content configured to be rendered in a second portion of the display of the computing device upon a request to pause rendering of the primary content.

BRIEF DESCRIPTION OF THE DRAWINGS

The description herein makes reference to the accompanying drawings wherein like reference numerals refer to like parts throughout the several views, and wherein.

DETAILED DESCRIPTION

Users of hosting websites access primary content stored by the hosting website and play back the content on various computing devices. Primary content can include games, music, videos, news stories, or other applications of interest to the users. The hosting website can provide access to the primary content to users without charge by rendering secondary content in close proximity to the primary content where the secondary content is sponsored by third parties such as advertisers who pay the hosting website to render the secondary content. Secondary content can include games, music, videos, textual overlays, or other applications intended to interest the user of the hosting website in the subject matter of the secondary content. Existing methods of rendering secondary content are becoming ineffective at enticing users to send signals to their computing devices that the users desire to access the secondary content. Third parties providing secondary content, such as advertisers, are interested in high click thru rates (CTR) and can offer higher payments for higher CTRs. Systems and methods of delivering and rendering primary content and secondary content that improve CTR to the secondary content are disclosed herein.

Figure 1:
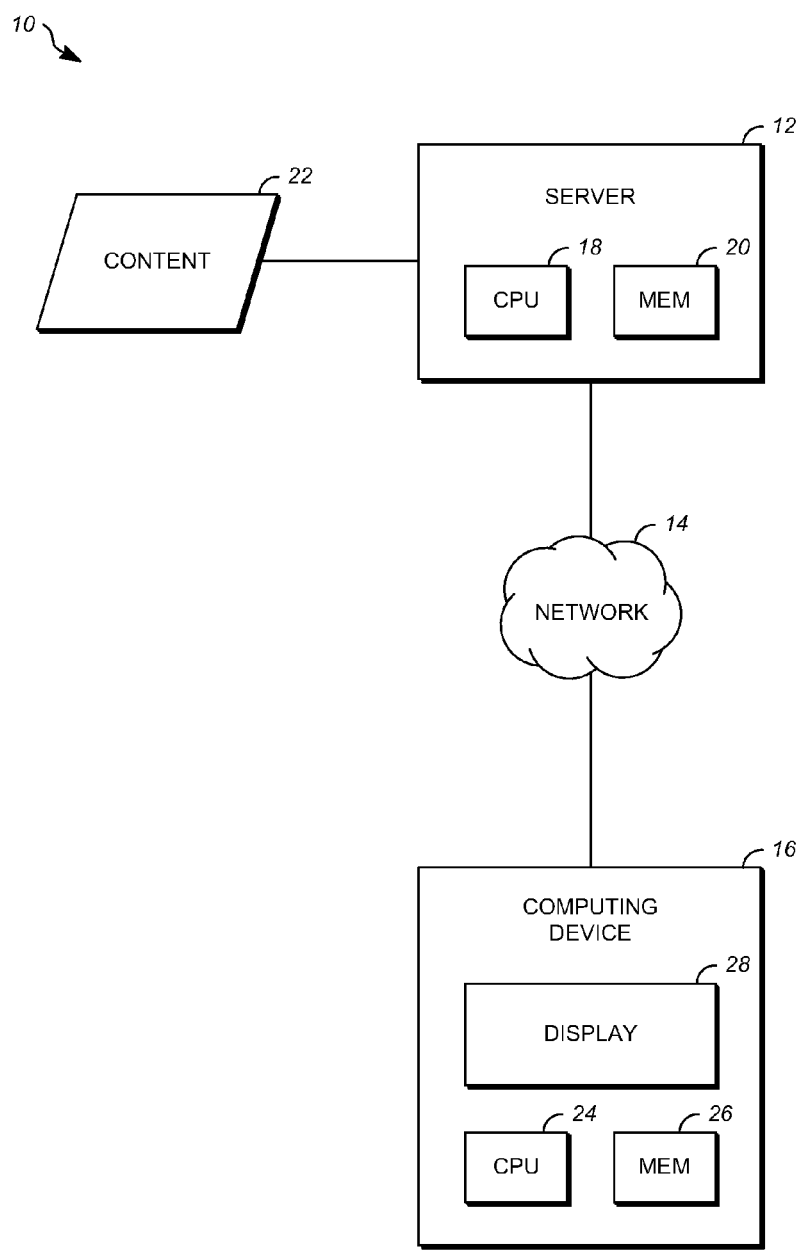
FIG. 1 is a block diagram of a system for delivering content.

FIG. 1 is a block diagram of a system 10 in accordance with one embodiment. The system 10 can include a server 12, a network 14, and a computing device 16. The server can include one or more processors, such as central processing unit (CPU) 18 and a memory 20 such as random access memory (RAM). The server 12 can be part of a computing cluster whereby the server 12 and additional servers share resources, such as storage memory, and load balance the processing of requests to the server 12. The server 12 can alternatively be part of a cloud computing system, or the cloud, which can include hundreds or thousands of servers configured to provide scalable computing resources. The memory 20 stores data and program instructions which are used by the CPU 18.

In one embodiment, content 22 is resident on or otherwise accessible to the server 12. A computing device 16 can communicate with the server 12 over the network 14 to request access to the content 22 which can include, e.g., requesting access to a hosting website which includes games, music, videos, news stories, applications, or any other type of software or data which a user may wish to render on the computing device 16. All such games, music, videos, news stories, applications, software, graphics, and audio visual or other data of any kind are referred to here generically as "content." Examples of suitable hosting websites for implementation of the system 10 include the YouTube™ and Google Video™ websites; other video hosting sites are known as well, and can be adapted to operate according the teaching disclosed herein. It will be understood that the term "website" represents any teaching, system, or method of providing content 22 and is not intended to be limited to systems that support content provided via the Internet or the HTTP protocol.

The network 14 couples the server 12 and computing device 16 for transferring information regarding content 22 between the server 12 and the computing device 16. The network 14, can, for example, be the Internet. The network 14 can also be a local area network (LAN), wide area network (WAN), virtual private network (VPN), wireless local area network such as one based on the IEEE 802.11 standards, or any other means of transferring information about the content 22 from the server 12 to the computing device 16. Communication between the computing device 16 and server 12 can also be based on any other suitable wireless standards such as 3G or 4G. While only a single computing device 16 is shown, it is understood that large numbers (e.g. millions) of devices can be in communication with the server 12 at any time.

The computing device 16 can include one or more processors such as a CPU 24, a memory 26 such as RAM, and a display 28. The CPU 24 can control the operations of the computing device 16. The CPU 24 can be connected to the memory 26 by, for example, a memory bus. The memory 26 stores data and program instructions that are used by the CPU 24. The computing device 16 can be a desktop computer, laptop, notepad, personal digital assistant, tablet computer, smart phone, or any other suitable computing device 16. The computing device 16 in this embodiment is a mobile telephone that is equipped with an operating system, which may be, e.g., the Android™ operating system published by Google Inc. of Mountain View, Calif.

The display 28 is configured to present content 22 on the computing device 16 in a format suitable for a user's visual review and selection for rendering. Computing device 16 may allow playback of content 22 within an application window of a web browser. For example, playback can occur using an embedded video player, such as, for example, the Flash™ player from Adobe Systems, Inc. or any other player adapted for the file formats used in the server 12. For example, a user can access a hosting website through an application window shown on the display 28 to review the available content 22 for rendering as listed by content descriptor. The user can then choose specific content 22 to play back or render within any portion of display 28. Content descriptors include content title, content description, and/or other pieces of information that can describe the nature of the content 22. In one embodiment, the display 28 can be integrated within the computing device 16. In an alternative embodiment, the display 28 can be separate from and connected to the computing device 16 via a wired or wireless coupling such as a USB cable or a Bluetooth-enabled wireless connection, or any other suitable connection means. The display 28 can be implemented in various ways, including by a liquid crystal display (LCD) or a cathode-ray tube (CRT).

Figure 2A:
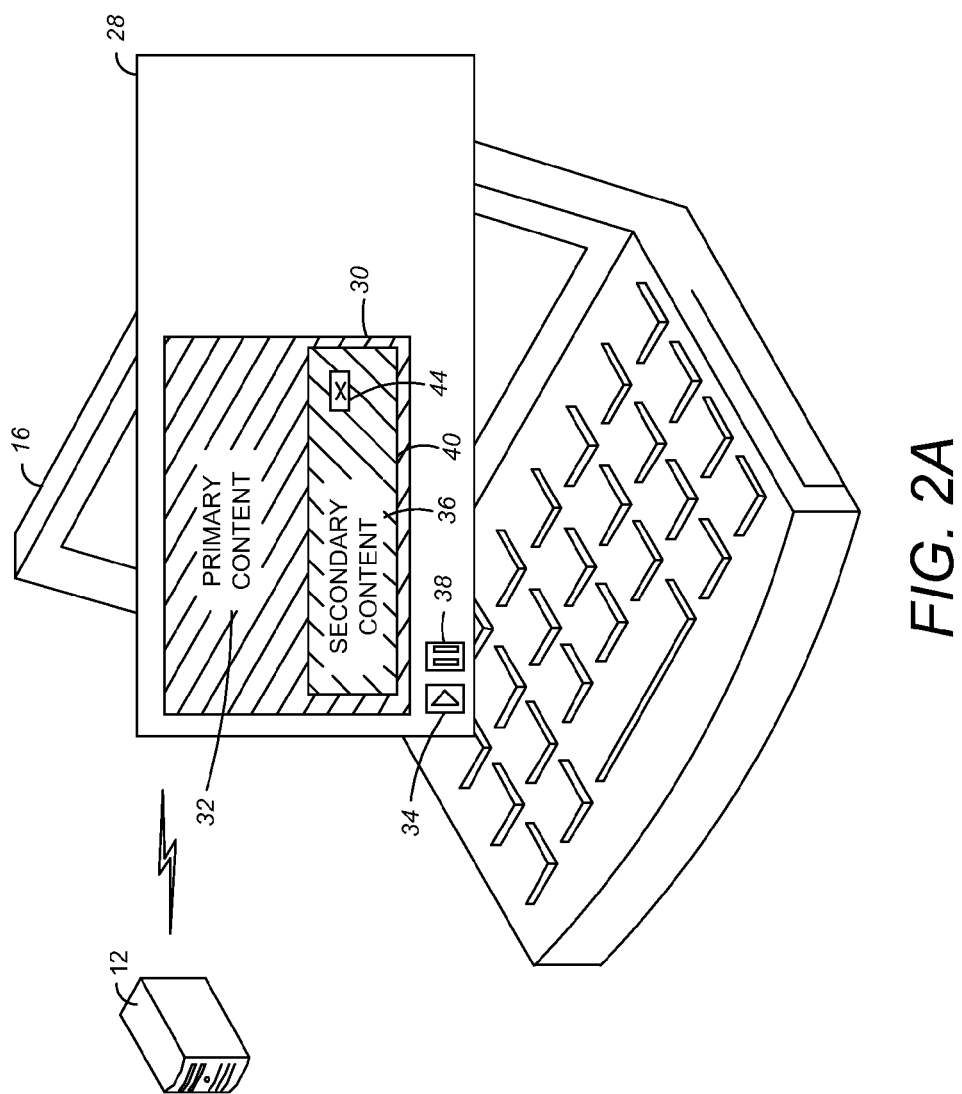
FIGS. 2A and 2B are schematic illustrations of the use of the system depicted in FIG. 1.

FIG. 2A is a schematic illustration of the use of the system 10 according to an illustrative embodiment. In this schematic, the computing device 16 is a laptop computer. A user of the computing device 16 can review available content 22 for rendering by accessing a hosting website as hosted by server 12. In one embodiment, accessing the hosting website may cause a webpage to be displayed to the user of the computing device 16. In another embodiment, accessing the hosting website may cause the display of content within a portion of the display 28 of the computing device 16. The user can initiate rendering primary content 32, e.g. content 22 the user desires to render on the computing device 16 as accessed on the hosting website, in a first portion of the display 30 as shown in FIG. 2A or in an alternate portion of the display 28. Initiating primary content 32 can be accomplished by the user selecting a content descriptor describing the primary content 32, selecting an object associated with the primary content 32 to send a signal to render the primary content 32 such as a play button 34, or by any other suitable means to signal a request to begin rendering the selected primary content 32.

The user input can trigger transmission of a request from the computing device 16 to the server 12 that specifies the primary content 32 be rendered in the first portion of the display 30 of the computing device 16. Such a request can specify the primary content 32 to be rendered and include information identifying the computing device 16. Such a request can also include configuration information pertaining to the computing device 16. The configuration information can be supplied directly or indirectly by the computing device 16 during an initiation process in which the user establishes an account for the hosting website at server 12. Alternatively, this configuration information can be stored in advance at the server 12, or at a location accessible by the server 12. For example, the user of the computing device 16 can enter in the appropriate configuration information via an online form. Alternatively, the configuration information need not be supplied for the user to access the hosting website, for example, when the hosting website does not require users to establish accounts to access primary content 32.

The server 12 can perform authentication and/or validation processing on the request that it receives from the computing device 16 to determine if it is appropriate to render the primary content 32. For example, the server 12 can determine based on the configuration information whether the computing device 16 is capable of physically running the requested primary content 32. The server 12 can also determine from the information contained in the request whether the request is authentic, for example, access to the server 12 can be via a password-protected account associated with the hosting website. Though the server 12 is illustrated for simplicity as a single machine, it is understood that the server 12 is not necessarily implemented as a single machine. The server 12 operations as described can be accomplished with multiple machines having one or more processors and memory operating in the system 10 of FIG. 1.

During the rendering of the primary content 32, the user can initiate rendering secondary content 36, e.g. content 22 provided by third parties such as advertisers who pay the hosting website to render the secondary content 36 in proximity to the primary content 32, within a second first portion of the display 40. Initiating secondary content 36 can be accomplished by the user selecting an object associated with the primary content 32 to send a signal to pause rendering of the primary content 32 such as a pause button 38, or by any other suitable means to signal a request to begin rendering the secondary content 36. The secondary content 36 as initially rendered in FIG. 2A is shown in an overlay positioned with the second portion of the display 40 within the first portion of the display 30. This is merely exemplary, as the size and location of the rendered secondary content 36 can vary within the display 28. The secondary content 36 rendered can include textual overlays, games, music, videos, or other applications intended to interest the user having initiated the secondary content 36 by sending a signal to pause rendering of the primary content 32.

Figure 2B:
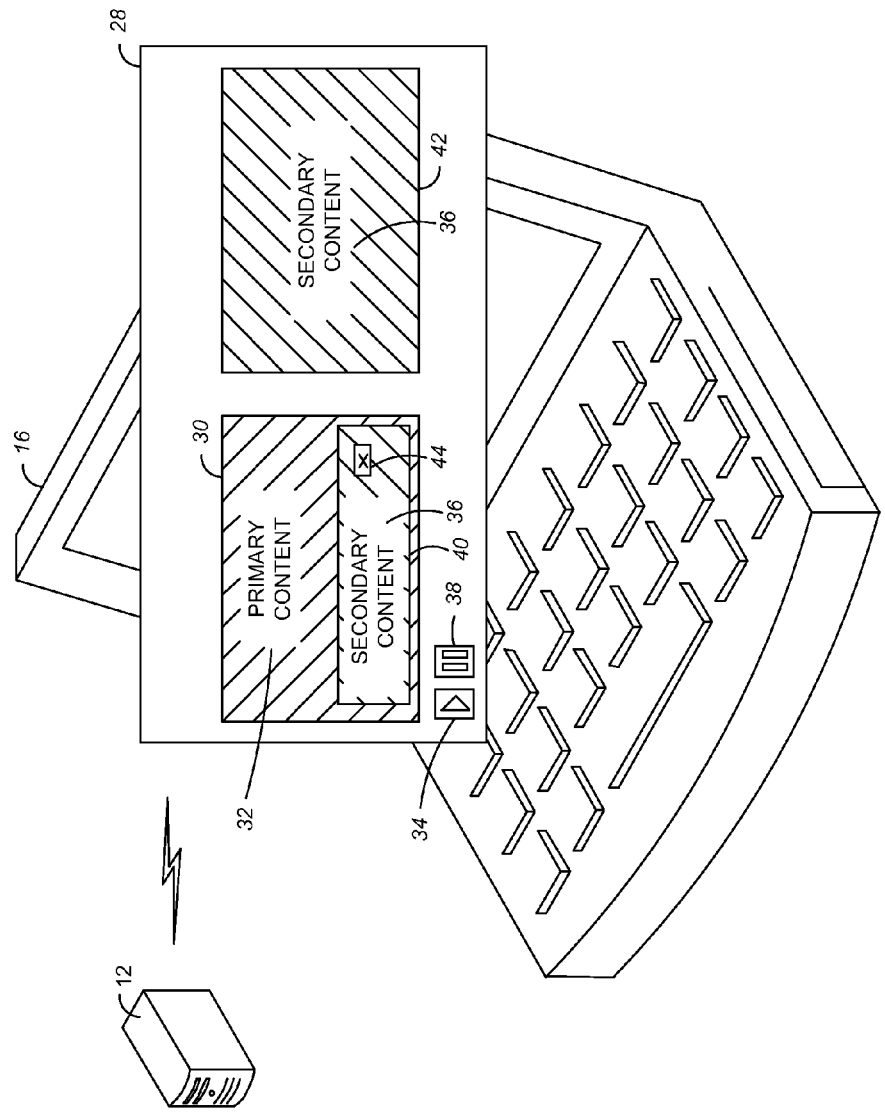

Once the secondary content 36 is rendered and the primary content rendering is paused in the first portion of the display 30, the user can take several actions as further described in FIGS. 2B, 3, and 4 below. As shown in FIG. 2B, one user action of particular interest to third-parties providing the secondary content 36, such as advertisers, is a user sending a request, e.g. clicking on a link, to access the secondary content 36. Once a request is received to access the secondary content 36, the secondary content 36 can be rendered in a third portion of the display 42, allowing the user to view additional information regarding the secondary content 36 than that which was rendered in the overlay second portion of the display 40. Rendering secondary content 36 in a second portion of the display 40 which is an overlay to the first portion of the display 30 upon receiving a signal pausing the rendering of the primary content 32 can significantly increase the CTR to the secondary content 36 over methods that render the secondary content 36 in response to different inputs or signals or in different portions of the display 28. The second portion of the display 40 can overlap the first portion of the display 30 when rendering the secondary content 36 as shown in FIG. 2A or it can be a separate portion of the display 28 (not shown).

In each of the embodiments described herein, the user has the option of not having secondary content 36 displayed in proximity to primary content. In other words, the user may opt out of having secondary content 36 displayed to them. For instance, if the hosting website described above requires users to establish accounts to access primary content 32, a user may select as a preference that they would like to opt out of having secondary content 36 displayed to them. In addition, a user may select whether to have their preferences, such as the number of times they have viewed a particular type of primary content 32, used to generate the secondary content 36. In this manner, the user may opt out of having the secondary content 36 be specifically targeted for them.

Figure 3:
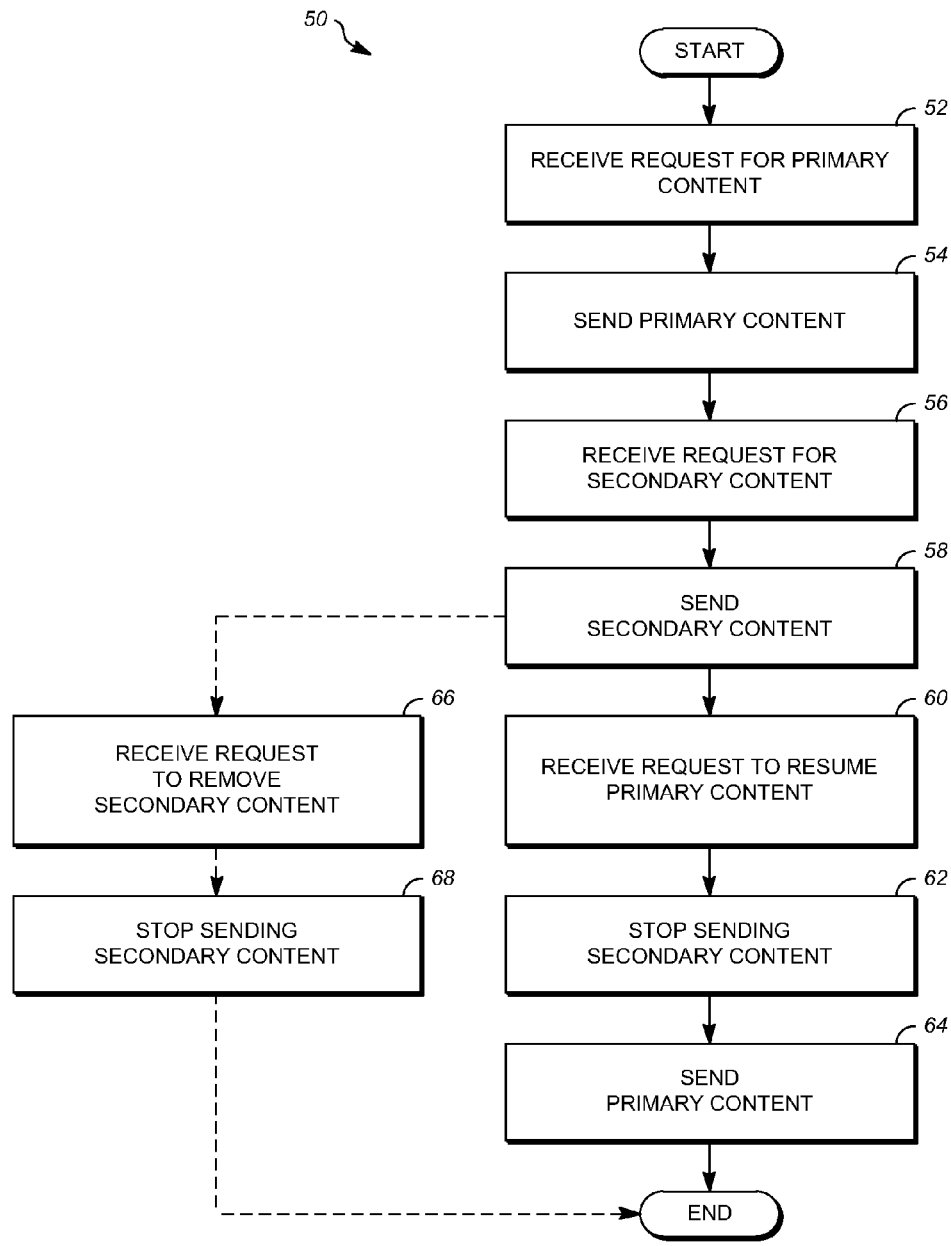
FIG. 3 is a logic flow chart of a process performed by the server in the system of FIG. 1.

FIG. 3 is a logic flow chart of a process 50 performed by the server 12 in the system 10 of FIG. 1. Beginning at stage 52, the server 12 can receive a request for primary content 32. The request from primary content 32 can be sent by the computing device 16 and based on a user input requesting to render primary content 32. The request for primary content 32 can also be received through other suitable methods of generating the request. After receiving the request for the primary content 32, the server 12 can send the primary content 32 to the computing device 16 at stage 54 with the primary content 32 being configured to render in a portion of the display 28 of the computing device 16, such as first portion of the display 30 shown in FIG. 2.

Once the primary content 32 is sent, the server 12 can receive a request for secondary content 36 at stage 56. The request for secondary content 36 can be sent by the computing device 16 and based on a user input requesting to pause rendering the primary content 32. Alternatively, the request for the secondary content 36 can be received with the request for the primary content 32 and the rendering of the primary content 32 and the secondary content 36 can be based on user inputs to the computing device 16. The request for secondary content 36 can also be received through other suitable methods of generating the request. After receiving the request for secondary content 36, the server 12 can send the secondary content 36 to the computing device 16 at stage 58 with the secondary content 36 being configured to render in a second portion of the display 40 as shown in FIG. 2A, or another respective portion of the display 28, upon receipt of a request to pause rendering of the primary content 32.

The server 12 can send means for the user to pause rendering of the primary content 32. Pausing the primary content 32 can trigger rendering of the secondary content 36 in a second portion of the display 40 as shown in FIG. 2A, or within another respective portion of the display 28. Once the rendering of the primary content 32 is paused and the secondary content 36 is rendering, the server 12 can receive a request to resume rendering the primary content 32 at stage 60. This request to resume rendering the primary content 32 can be based on the server 12 sending means for the user to resume rendering of the primary content 32. The means for the user to resume rendering of the primary content 32 can be a user input to an object associated with the primary content 32, such as the play button 34 shown in FIG. 2A, to send a signal to resume rendering of the primary content 32, or by any other suitable means to signal a request to resume rendering the primary content 32.

Once the request is received to resume rendering the primary content 32, the server 12 can stop sending the secondary content 36 to the computing device 16 at stage 62. The secondary content 36 may be configured to be removed from the second portion of the display 40 upon receipt of the request to resume rendering the primary content 32. Once the secondary content 36 is removed from the second portion of the display 40, the server 12 can send the primary content 32 to the computing device 16 at stage 64 with the primary content 32 being configured to be rendered in the first portion of the display 30 upon the server 12 receiving the request to resume rendering of the primary content 32. Once the primary content 32 is sent to the computing device 16, the process 50 ends.

In an alternative implementation, once the server 12 sends the secondary content 36 to the computing device 16 at stage 58 with the secondary content 36 being configured to render in the second portion of the display 40 as in FIG. 2A, or within another respective portion of the display 28, the process 50 can continue with the server 12 receiving a request to remove the rendering of the secondary content 36 at stage 66. This request to remove the rendering of the secondary content 36 can be based on the server 12 sending means for the user to remove the rendering of the secondary content 36. The means for the user to remove the rendering of the secondary content 36 can be a user input to an object associated with the secondary content 36, such as a close button 44, as shown in FIG. 2A, to send a signal to remove the rendering of the secondary content 36, or by any other suitable means to signal a request to remove the rendering of the secondary content 36.

Once the request is received to remove the rendering of the secondary content 36, the server 12 can stop sending the secondary content 36 to the computing device 16 at stage 68. The secondary content 36 may be configured to be removed from the second portion of the display 40 or from any other respective portion of the display 28 upon receipt of the request to remove the rendering of the secondary content 36. Once the secondary content 36 is removed from the second portion of the display 40, or from any other respective portion of display 28, the process 50 ends. If the request received is simply to remove the rendering of the secondary content 36 as described in this alternative implementation, the display 28 of the computing device 16 can show a paused rendering of the primary content 32 in the first portion of the display 30, the paused rendering of the primary content 32 no longer sharing the display 28 with the secondary content 36.

The primary content 32 described above in FIG. 3 and below in FIG. 4 can be, for example, video content, such as a music video, television clip, movie, or hosting-website user uploaded video. The secondary content 36 described above in FIG. 3 and below in FIG. 4 can be, for example, advertising content, such as a textual overlay that includes a website link to access the secondary content 36 in a separate application window. Other types of primary content 32 and secondary content 36 are possible. In one example implementation of the process 50, a user can pause rendering of a music video in a first portion of the display 30 on a computing device 16, for example to answer the phone, and a textual overlay will begin rendering in a second portion of the display 40, advertising a product or service website. The user can choose to close the textual overlay, access the website advertised in the textual overlay, or resume rendering the music video at which point the textual overlay can stop rendering in the second portion of the display 40.

Figure 4:
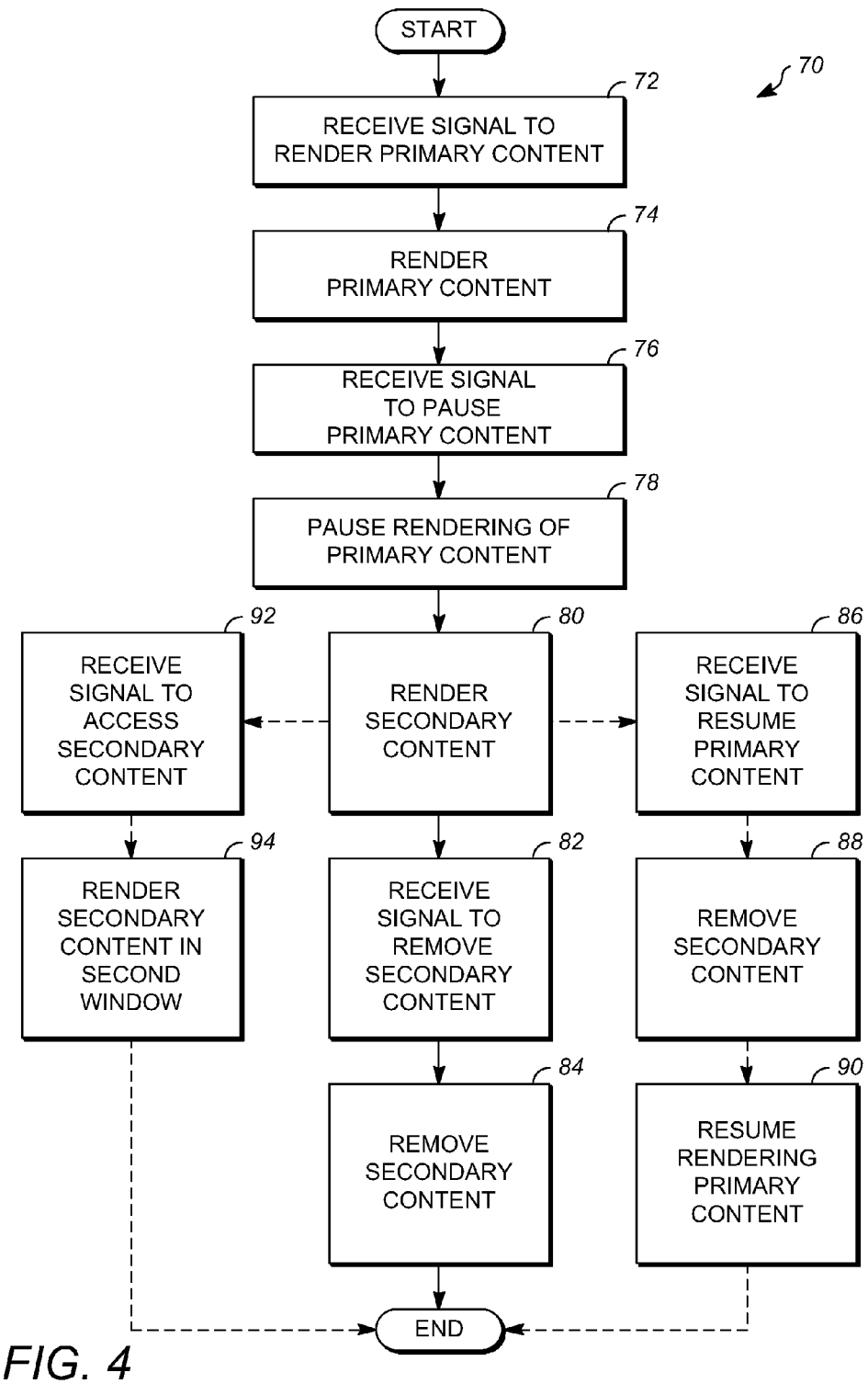
FIG. 4 is a logic flow chart of a process preformed by a computing device in the system of FIG. 1.

FIG. 4 is a logic flow chart of a process 70 preformed by a computing device 16 in the system of FIG. 1. Beginning at stage 72, the computing device 16 can receive a signal to render primary content 32. The signal can be based on a user input requesting to render primary content 32, such as the user selecting or clicking an input associated with the primary content 32, such as the play button 34 show in FIG. 2. The signal to render the primary content 32 can also be received through other suitable methods of receiving the signal. After receiving the signal to render the primary content 32, the computing device 16 can render the primary content 32 in a portion of the display 28 at stage 74, such as first portion of the display 30 shown in FIG. 2.

Once the primary content 32 is rendered, the computing device 16 can receive a signal to pause the rendering of the primary content 32 from the user at stage 76. The signal can be based on a user input requesting to pause rendering of the primary content 32, such as the user selecting or clicking an input associated with the primary content 32, such as the pause button 38 shown in FIG. 2. The signal to pause the rendering of the primary content 32 can also be received through other suitable methods of receiving the signal. After receiving the signal to pause the rendering of the primary content 32, the computing device 16 can pause the rendering of the primary content in the first portion of the display 30 at stage 78.

Pausing the rendering of the primary content 32 can send a signal to the computing device 16 to render the secondary content 36 in at least a portion of the display 28 at stage 80, such as second portion of the display 40 as shown in FIG. 2A. Once the secondary content 36 is rendered in at least a portion of the display 28, the computing device 16 can receive a signal to remove the rendering of the secondary content 36 from the user at stage 82. The signal can be based on a user input requesting to remove the rendering of the secondary content 36, such as the user selecting or clicking an input associated with the secondary content 36, such as the close button 44 shown in FIG. 2A. The signal to remove the rendering of the secondary content 36 can also be received through other suitable methods of receiving the signal. After receiving the signal to remove the rendering of the secondary content 36, the computing device 16 can remove the rendering of the secondary content 36 at stage 84, for example, by removing the secondary content 36 from the second portion of the display 40. After removal of the secondary content 36, the process 70 ends. If the request received is simply to remove the rendering of the secondary content 36, the display 28 of the computing device 16 can show a paused rendering of the primary content 32 in the first portion of the display 30. The paused rendering of the primary content 32 no longer shares the display 28 with the secondary content 36.

In an alternative implementation, once the computing device 16 renders the secondary content 36 in a second portion of the display 40 at stage 80, the process 70 can continue with the computing device 16 receiving a signal to resume rendering the primary content 32 at stage 86. The signal can be based on a user input requesting to resume rendering the primary content 32, such as the user selecting or clicking an input associated with the primary content 32, such as the play button 34 shown in FIG. 2A. The signal to resume rendering the primary content 32 can also be received through other suitable methods of receiving the signal. After receiving the signal to resume rendering the primary content 32, the computing device 16 can remove the rendering of the secondary content 36 from the second portion of the display 40 at stage 88 and resume the rendering of the primary content 32 in the first portion of the display 30 at stage 90. Once the rendering of the primary content 32 is resumed, the process 70 ends.

In a second alternative implementation, once the computing device 16 renders the secondary content 36 in at least a portion of the display 28 at stage 80, such as a first portion of the display 30 as shown in FIG. 2A, the process 70 can continue with the computing device 16 receiving a signal to access the secondary content 36 from the user at stage 92. For example, the secondary content 36 can be rendered in a textual overlay in the second portion of the display 40 overlapping the first portion of the display 30 and include a link to a website. The user can select or click on the link to send a signal to the computing device 16 indicating that the user wishes to access the secondary content 36. Once the signal to access the secondary content 36 is received by the computing device 16, the secondary content 36 can be rendered in a portion of display 28 at stage 94, such as third portion of the display 42 shown in FIG. 2B. After the secondary content 36 is rendered in the third portion of the display 42, the process 70 ends. The third portion of the display 42 can be a completely separate portion of the display 28 from the first portion of the display 30 and second portion of the display 40 as shown in FIG. 2B, or it can overlap the first portion of the display 30 and/or the second portion of the display 40 when rendering the secondary content 36.

The embodiments of the server 12 and/or the computing device 16 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the server 12 and the computing device 16 do not necessarily have to be implemented in the same manner.

Further, in one embodiment, for example, the server 12 or the computing device 16 can be implemented using a general purpose computer/processor with a computer program that, when executed, carries out any of the respective methods, algorithms and/or instructions described herein. In addition or alternatively, for example, a special purpose computer/ processor can be utilized which can contain specialized hardware for carrying out any of the methods, algorithms, or instructions described herein.

The server 12 can be implemented on a single device, or as multiple devices such as a computing cluster whereby the server 12 and additional servers share resources. The server 12 can alternatively be part of a cloud computing system, or the cloud, which can include hundreds or thousands of servers configured to provide scalable computing resources. The computing device 16 can be implemented on a device separate from the server 12, such as a portable communications device (i.e. a smart phone). Other suitable server 12 and computing device 16 implementation schemes are available. For example, the computing device 16 can be a generally stationary personal computer rather than a portable communications device.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention. For example, the operation of the preferred embodiments illustrated above can be applied to other media types, such as audio, text, and images.

The invention has been described in particular detail with respect to a few embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware or hardware, and when embodied in software, could be downloaded to reside on and be operated from different platforms used by real time network operating systems.

The invention also relates to an apparatus for performing the operations herein. This apparatus may be specially constructed for the required purposes, or it may comprise a general-purpose computer selectively activated or reconfigured by a computer program stored on a computer readable storage medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will be apparent to those of skill in the art, along with equivalent variations. In addition, the invention is not described with primary to any particular programming language. It is appreciated that a variety of programming languages may be used to implement the teachings of the invention as described herein, and any reference to specific languages are provided for disclosure of enablement and best mode of the invention.

The invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the following claims.

What is claimed is:

1. A method of delivering content to a user having a computing device including a display, comprising:
   receiving a request for primary content, wherein the primary content is user selected video content;
   sending the primary content to the computing device, the primary content configured to be rendered in a first portion of the display of the computing device;
   receiving an indication corresponding to a user request to pause rendering of the primary content;
   sending secondary content to the computing device in response to the indication corresponding to the user request to pause rendering of the primary content, wherein the secondary content is advertising content configured to be rendered in a second portion of the display, and wherein the rendering of the primary content in the first portion of the display of the computing device is paused while the secondary content is rendered in the second portion of the display;

receiving an indication corresponding to a user request to access the secondary content; and sending additional information related to the secondary content to the computing device in response to the indication corresponding to the user request to access the secondary content; wherein the additional information related to the secondary content is configured to be rendered in a third portion of the display.

2. The method of claim 1, further comprising:
sending means for the user to pause rendering of the primary content.

3. The method of claim 1, further comprising:
receiving an indication corresponding to a user request to resume rendering of the primary content; and
stopping the sending of the secondary content to the computing device, the secondary content configured to be removed from the second portion of the display in response to the indication corresponding to the user request to resume rendering of the primary content; and
sending the primary content to the computing device, the primary content configured to be rendered in the first portion of the display in response to the indication corresponding to the user request to resume rendering of the primary content.

4. The method of claim 3, further comprising:
sending means for the user to pause rendering of the primary content; and
sending means for the user to resume rendering of the primary content.

5. The method of claim 1, further comprising:
receiving an indication corresponding to a user request to remove rendering of the secondary content; and
stopping the sending of the secondary content to the computing device, the secondary content configured to be removed from the second portion of the display in response to the indication corresponding to the user request to remove the secondary content.

6. The method of claim 5, further comprising:
sending means for the user to pause rendering of the primary content; and
sending means for the user to remove rendering of the secondary content.

7. The method of claim 1, wherein the first portion of the display and the second portion of the display are overlapping portions.

8. A method of rendering content to a user having a computing device including a display, comprising:
receiving a signal to render primary content from the user wherein the primary content is user selected video content;
rendering the primary content in a first portion of the display of the computing device;
receiving a signal to pause rendering of the primary content from the user;
pausing the rendering of the primary content in the first portion of the display;
receiving secondary content in response to the pausing of the rendering of the primary content wherein the secondary content is advertising content; and
rendering the secondary content in a second portion of the display; and
wherein the first portion of the display and second portion of the display are overlapping portions.

9. The method of claim 8, further comprising:
receiving a signal to resume rendering the primary content from the user;

removing the rendering of the secondary content from the second portion of the display; and
resuming the rendering of the primary content in the first portion of the display.

10. The method of claim 8, further comprising:
receiving a signal to remove rendering the secondary content from the user; and
removing the rendering of the secondary content from the second portion of the display.

11. The method of claim 8, further comprising:
receiving a signal to access the secondary content from the user;
receiving additional information related to the secondary content responsive to receiving the signal; and
rendering the additional information related to the secondary content in a third portion of the display.

12. A system for delivering content to a user, comprising:
a server in communication with a network, wherein the network is in communication with a computing device including a display, the server including:
a processor for controlling the operations of the server; and
a memory for storing data and program instructions used by the processor wherein the processor is configured to execute instructions stored in the memory to:
receive a request for primary content wherein the primary content is user selected video content;
send the primary content to the computing device, the primary content configured to be rendered in a first portion of the display of the computing device;
receive an indication corresponding to a user request to pause the primary content;
send secondary content to the computing device, wherein the secondary content is advertising content configured to be rendered in a second portion of the display of the computing device in response to the indication corresponding to the user request to pause rendering of the primary content, and wherein the rendering of the primary content in the first portion of the display of the computing device is paused while the secondary content is rendered in the second portion of the display;
receive an indication corresponding to a user request to access the secondary content; and
send additional information related to the secondary content to the computing device, wherein the additional information related to the secondary content is configured to be rendered in a third portion of the display of the computing device in response to the indication corresponding to the user request to access the secondary content.

13. The system of claim 12, wherein the processor is further configured to:
receive an indication corresponding to a user request to resume rendering of the primary content;
stop the sending of the secondary content to the computing device, the secondary content configured to be removed from the second portion of the display in response to the indication corresponding to the user request to resume rendering of the primary content; and
send the primary content to the computing device, the primary content configured to be rendered in the first portion of the display in response to the indication corresponding to the user request to resume rendering of the primary content.

14. The system of claim 12, wherein the processor is further configured to:

receive an indication corresponding to a user request to remove rendering of the secondary content; and stop the sending of the secondary content to the computing device, the secondary content configured to be removed from the second portion of the display in response to the indication corresponding to the user request to remove the secondary content.

15. The system of claim 12, wherein the processor is further configured to:

receive an indication corresponding to a user request to access the secondary content; and render the secondary content in a third portion of the display in response to the indication corresponding to the user request to access the secondary content.

16. The system of claim 12, wherein the computing device further includes:

a computing device processor for controlling the operations of the computing device; and a memory for storing data and program instructions used by the computing device processor.

17. The system of claim 12, wherein the first and second portions of the display are overlapping portions.

18. A device in communication with a network for delivering content to a user, comprising:

a display;

a processor for controlling the operations of the device; and a memory for storing data and program instructions used by the processor wherein the processor is configured to execute instructions stored in the memory to:

receive a signal to render primary content from the user wherein the primary content is user selected video content, render the primary content in a first portion of the display, receive a signal to pause rendering of the primary content from the user, pause the rendering of the primary content in the first portion of the display, receive secondary content in response to the pausing of the rendering of the primary content wherein the secondary content is advertising content, render the secondary content in a second portion of the display receive a signal corresponding to a user request to access the secondary content; and render additional information related to the secondary content in a third portion of the display in response to the signal corresponding to the user request to access the secondary content;

wherein the first portion of the display and second portion of the display are overlapping portions.

* * * * *